Figure 1:
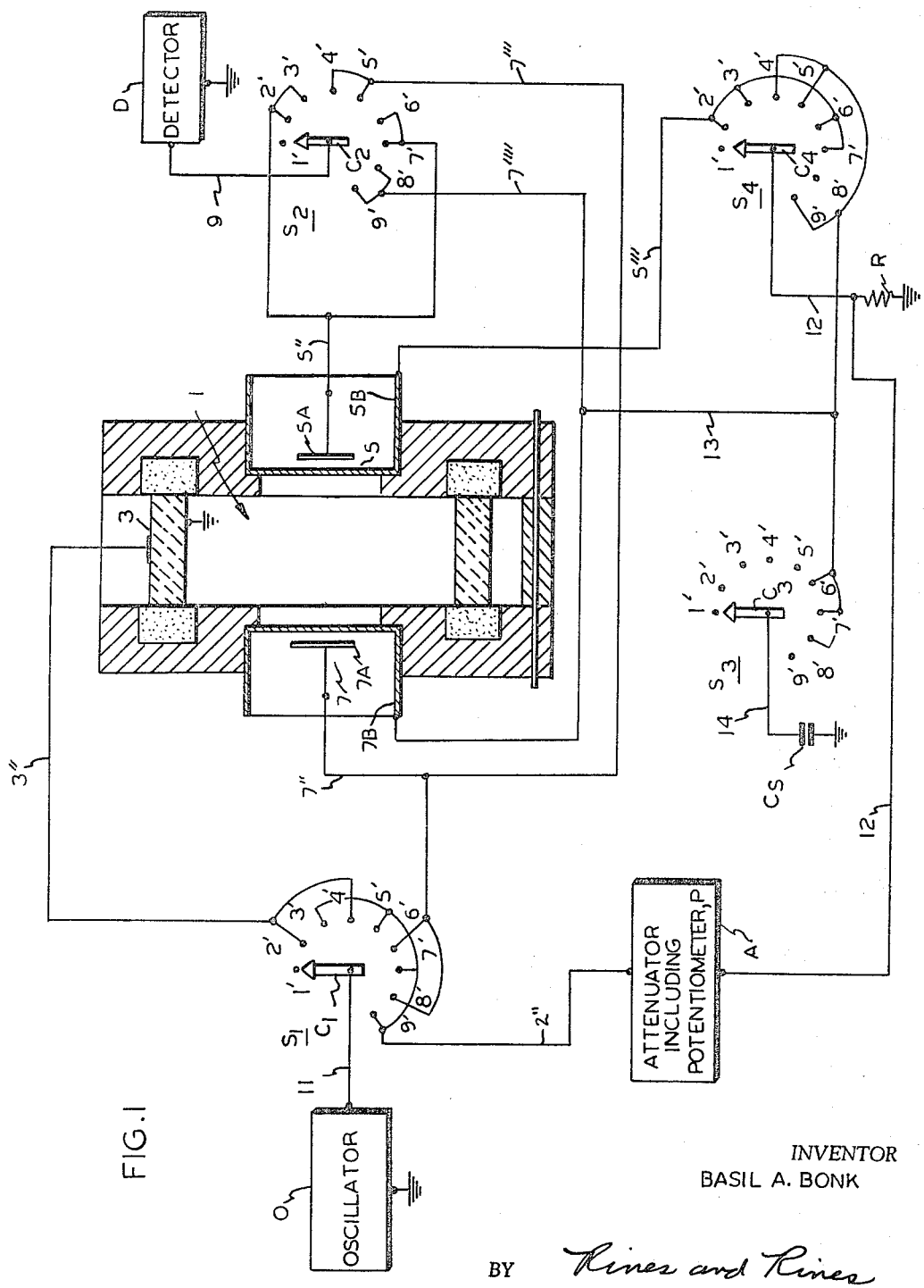

INVENTOR
BASIL A. BONK

BY *Rines and Rines*

ATTORNEYS

June 20, 1967  B. A. BONK  3,327,071
METHOD OF AND APPARATUS FOR COMPUTATION PARTICULARLY
SUITED FOR MICROPHONE ABSOLUTE CALIBRATION
Filed Jan. 27, 1964  2 Sheets-Sheet 2

INVENTOR
BASIL A. BONK

BY Rines and Rines

ATTORNEYS

United States Patent Office 3,327,071
Patented June 20, 1967

3,327,071
METHOD OF AND APPARATUS FOR COMPUTATION PARTICULARLY SUITED FOR MICROPHONE ABSOLUTE CALIBRATION
Basil A. Bonk, Arlington, Mass., assignor to General Radio Company, West Concord, Mass., a corporation of Massachusetts
Filed Jan. 27, 1964, Ser. No. 340,401
21 Claims. (Cl. 179—175.1)

The present invention relates to methods of and apparatus for computation particularly, though not exclusively, suited for the absolute calibration of microphones and the like; and, more specifically, to such calibration effected by closed-coupler reciprocity techniques.

While, as will hereinafter be made more evident, the computation feature of the invention may be used generally wherever its novel results are sought, for purposes of illustration it will be described as applied to the reciprocity calibration of pressure transducers and similar devices, all herein referred to as microphones. Heretofore, accurate calibration of this nature has been attainable only with complicated laboratory equipment requiring meticulously careful adjustment and considerable calculation to obtain reliable results at a single frequency.

An object of the present invention, on the other hand, is to provide a new and improved method of and apparatus for reciprocity calibration that greatly reduces the time and measurement difficulties of operation and enables rapid measurements at different frequencies in a routine manner but with accuracy entirely comparable with that attained by prior-art standardizing laboratories; i.e. to $\pm 0.1$ db or better with precision acoustic sources.

A further object is to provide such simplicity of operation in a highly portable unit that for the first time enables, for example, field checks of microphone sensitivity immediately prior to the taking of important measurements, and further enables ready correlation and consistency of sound measurements taken at different locations and at different times.

Still another object is to provide a novel analog computer and method that, while particularly suited to the calibration purposes above discussed in order to provide therein a simple, direct-reading and accurate answer, is also more generally useful in other applications as well.

Other and further objects will be made more evident hereafter and will be specifically delineated in the appended claims, the invention, in summary, including a dial-type analog computer embodying a logarithmic potentiometer the angular positions of the shaft of which are proportional to the logarithms of voltages that result from the acoustical transfers measured, with these shaft positions being transferred to an answer dial in a manner such that the necessary multiplications and divisions required for calculating microphone sensitivity or the like (in terms of voltage output per unit of acoustic pressure) are readily effected and indicated as an answer on the dial.

Figure 2:
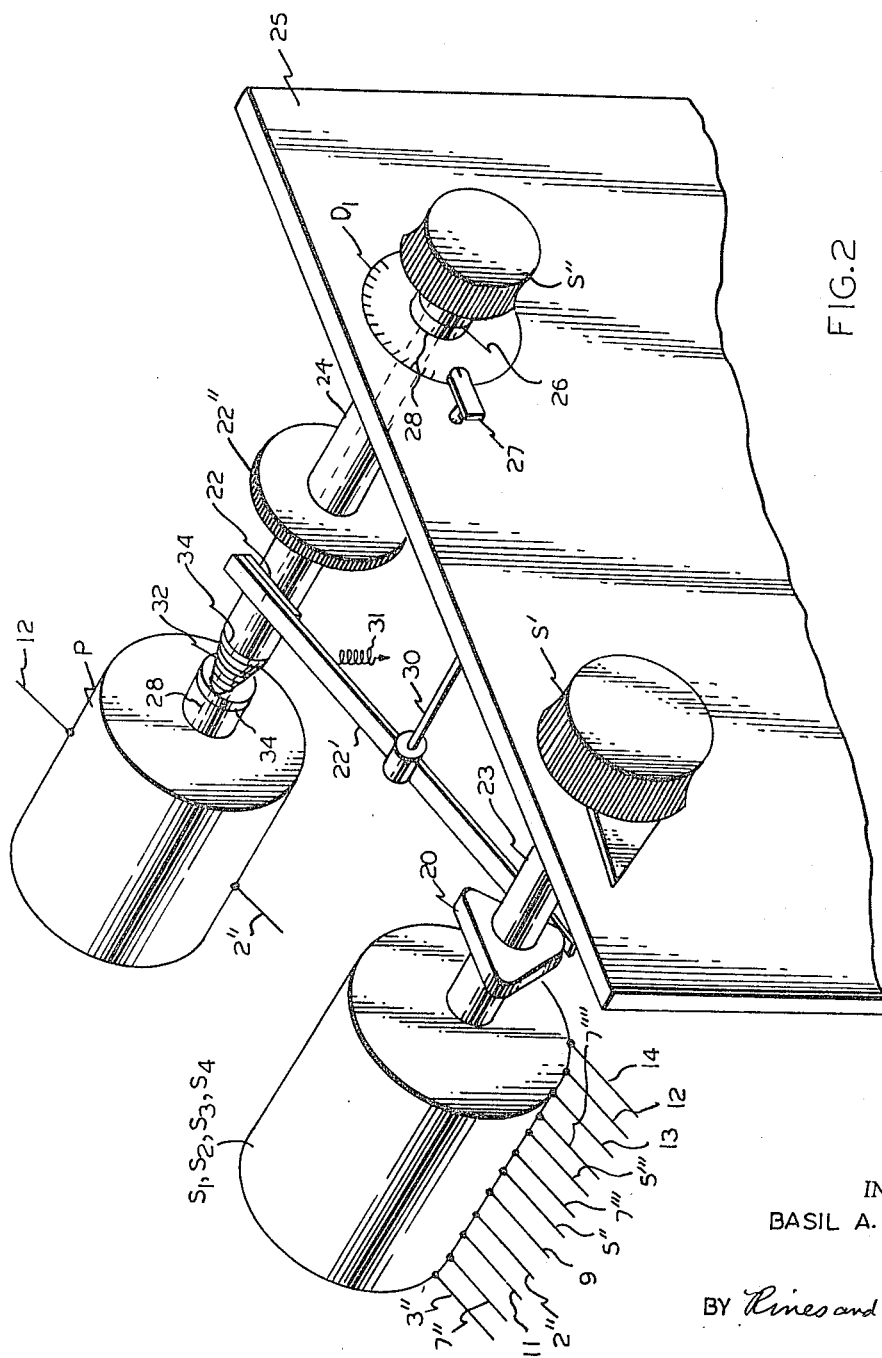

The invention will now be described in connection with the accompanying drawing, FIG. 1 of which is a schematic circuit diagram of the reciprocity calibration apparatus, with the closed cavity microphone structure illustrated in longitudinal section in preferred form; and FIG. 2 is an isometric view of the mechanical details of the computation apparatus embodying the logarithmic potentiometer and multiple-function switching mechanism of FIG. 1.

In FIG. 1, the auxiliary transducer employed to determine ratios of microphone sensitivities is illustrated at 3 in the form of a piezoelectric ring, as of barium titanate or the like, defining a cylindrical wall of the cavity 1 and, upon electrical excitation along conductor 3" (and, of course, a ground connection) producing a uniform and symmetrical sound pressure through the cavity chamber. Communicating with the cavity is a symmetrically placed microphone 5 to be calibrated and an opposing reciprocal microphone 7. The desired measurement of sensitivity M of the microphone 5 is determined substantially by the following expression:

(1) $M \text{ (in decibels)} = 10\left[ \log \frac{V_c}{\gamma P_o C_s} + \log \frac{V_2'}{V_1'} + \log \frac{V_2}{V_s}\right]$ where $V_c$ is the volume of the cavity 1, $P_o$ is the atmospheric pressure where the instrument is being operated, $\gamma$ is the ratio of constant-pressure specific heat to constant-volume specific heat of the gas within the cavity 1 (such as $\gamma = 1.4$ for air or hydrogen), $C_s$ is the value of the later-described current-sampling capacitor shown in FIG. 1, $V_2$, $V_2'$ and $V_1'$ are respectively detected voltages appearing across microphones 5 and 7, and $V_s$ is a voltage detected across sampling capacitor $C_s$ under later-explained stimuli. It is the automatic computation of this formula in response to a sequence of measurements in the system of FIG. 1 that is effected in accordance with the invention.

A multiple function switch is schematically shown as having four sections $S_1$, $S_2$, $S_3$ and $S_4$ synchronously operated, as by the shaft 23 and knob S' of FIG. 2, to cause the switch contactors $C_1$, $S_2$, $C_3$ and $C_4$ thereof to engage nine contact positions numbered 1' through 9'. In section $S_1$, contact positions 2' and 4' are interconnected and joined to the before-mentioned conductor 3" that enables driving of the auxiliary transducer 3; and contacts 6' and 8' are interconnected and joined to conductor 7" that connects with the ungrounded or inner electrode 7A of the reciprocal microphone 7. All other switch positions of switch section $S_1$, except open-position contact 1', are interconnected and joined to a common conductor 2" that is, in turn, connected to one terminal of an attenuator network A including the before-mentioned logarithmic potentiometer P. The contactor $C_1$ is connected by conductor 11 to the output of an oscillator or driving source O.

In switch section $S_2$, however, contact members 4' and 5' thereof are connected together and to conductor 7" and microphone electrode 7A by means of connection 7''', whereas contacts 8' 9' are both connected by conductor 7'''' to the outer or grounded electrode 7B of microphone 7. Switch contact members 2', 3', 6' and 7' are all connected at 5" to the inner electrode 5A of microphone 5 under test. Contactor $C_2$ is connected by conductor 9 to a detector D such as, for example, a sound level meter.

The first five and ninth positions of switch section $S_3$ are open, but contacts 6', 7' and 8' are connected at 13 to conductor 7'''' and the microphone electrode 7B, and the contactor $C_3$ is connected at 14 to the previously mentioned current-sampling capacitor $C_s$, the lower terminal of which is shown grounded.

In the fourth switch section $S_4$ of the multiple-function switch, contacts 2', 3', 6' and 7' are connected at 5''' to the outer microphone electrode 5B and the contacts 4', 5' and 9' are connected to the conductor 13 and thus through conductor 7'''' to the microphone electrode 7B. Switch contactor $C_4$, however, connects by conductor 12 to the output terminal attenuator A and, also, through an insert resistor R, to ground.

The testing or measurement sequence that is effected by operation of the knob S' to the various nine positions of the function switch $S_1$, $S_2$, $S_3$, $S_4$, obviating the necessity for physical interchanging of transducers and related equipment, and the control of the logarithmic potentiometer P to effect the required computation will now be described.

In open electrical switch position 1', a cam 20 mounted on the switch shaft 23 of control knob S', FIG. 2, is oriented to release pressure of a brake 22 against a knurled dial 22'' carried by a shaft 24 supporting the answer of readout dial $D_1$, calibrated in logarithmic units, at the front of the instrument panel 25. The operator may then rotate a knob S'' that is connected through a slip clutch 26 to the answer dial shaft 24 (and by an inner coaxial control shaft 28 to rotate the wiper control of the logarithmic potentiometer P) to set the answer dial $D_1$ (relative to a fixed indicator or reference position 27) so as to introduce the constant $$\log \frac{V_c}{\gamma P_o C_s}$$

into the computer. A spring coupling 32 contained between washers 34 couples the shafts 24 and 28. The volume $V_c$ of the cavity 1 is expressed in CGS units; $\gamma$ is a ratio, as before explained; $P_o$ is the barometric pressure in CGS units; and $C_s$ is the current-sampling capacitance converted from farads to CGS units.

In switch position 2', the oscillator O is connected through $C_1$ to conductor 3'' to drive the transducer 3, and the sound-level-meter or other detector D is connected through $C_2$ and 5'' to detect the resulting open-circuit voltage $V_2'$ of the microphone 5 as it picks up the sound pressure generated in the cavity 1 by the transducer 3. The cam 20 releases the brake 22' in switching from position 1' to position 2'.

Upon switching to position 3', the cam 20 releases the brake arm 22', causing it to pivot at 30 in response to spring tension at 31 and to apply the brake 22 to the knurled disc 22'' and thus to the answer-dial shaft 24, clamping the same. The oscillator O now drives the attenuator A through 2'' wtih the attenuator output applied along 12 in the same path that the voltage $V_2'$ was applied to the detector D in the previous switch position. The potentiometer-shaft knob S'' is now adjusted until the detector D matches the same value as when it detected $V_2'$ previously, independently of and thus wtihout corresponding movement of the clamped answer dial $D_1$. (Since the resistive insert technique is used to determine the open-circuit voltage, the detector D, when the switches are in position 2, actually reads a fraction of $V_2'$ because a portion of $V_2'$ exists as a drop across the microphone's own internal impedance.) The angular position adjustment of the potentiometer shaft control 28, which is linear in db, now equals $$\log \frac{V_2'}{E}$$

where E is the fixed voltage of the driving oscillator O, plus a constant.

In switch position 4', the cam 20 again releases brake 22 so that the answer dial D' is again coupled to move with the potentiometer shaft 28 upon further movement of the knob S''. The oscillator O again drives the transducer 3, but it is the open-circuited voltage produced by reciprocal microphone 7 that is now applied along 7''' to detector D, giving the measurement $V_1'$, or a measurement proportional thereto.

Switching knob S' to position 5' results in continued disengagement of the brake 22, maintaining the answer dial $D_1$ coupled to the potentiometer shaft 28. The oscillator O now drives the attenuator A along 2'' with the attenuation output applied at 12 and 13 through the same path that the voltage $V_1'$ was applied to the detector D. The potentiometer knob S'' is now adjusted until the detector D indicates a matching to the value when $V_1'$ was previously measured. The angular position of the shaft 28 now equals $$\log \frac{V_1'}{E}$$

plus a constant. While moving the knob S'' and potentiometer control shaft 28 from the position of adjustment of position 3' to this new position, the term $$\log \frac{V_2'}{E} - \log \frac{V_1'}{E} \text{ or } \log \frac{V_2'}{V_1'}$$

(the ratio of measurements $V_2'$ and $V_1'$) has been inserted into the answer dial $D_1$ through the synchronous corresponding movement of the dial $D_1$ with the shaft 28. Thus voltages are measured by a substitution method and a voltage ratio appears as a difference in the attenuator settings necessary to produce a constant detector reading.

In switch position 6', the oscillator O drives, with a current, the reciprocal microphone 7 through the current-sampling capacitance $C_s$ producing a new voltage $V_2$ from microphone 5 to excite the detector D; and, in position 7', with the attenuator A in the same circuit as 3', adjustment is made so that the detector D reads the same value as when excited by $V_2$. In positions 6' and 7' the brake 22 is engaged.

Lastly, the same driving current from the preceding step is sampled by capacitor $C_s$, reading $V_s$ at detector D; and, in position 9', with the brake 22 disengaged, adjustment of knob S'' renders the last term proportional to $V_s$ to complete the expression then indicated at 27 on dial $D_1$ as:

$$(2) \quad \log \frac{V_c}{\gamma P_o C_s} + \log \frac{V_2'}{V_1'} + \log \frac{V_2}{V_s}$$

i.e., the product of the ratios of successive pairs of measurements $$\left(\frac{V_2'}{V_1'}\right)\left(\frac{V_2}{V_s}\right)$$

multiplied by a constant $$\frac{V_c}{\gamma P_o C_s}$$

The answer dial is calibrated to show ten times the value, thus indicating the desired value of M (Equation 1) in decibels, directly.

Thus, the function switch $S_1$, $S_2$, $S_3$, $S_4$ not only controls the oscillator O, detector D and transducer connections, but it controls the brake 22 to hold the answer dial $D_1$ stationary while the attenuator A is set to correspond to the numerator voltages $V_2$ and $V_2'$ and then re-engage the dial for the setting of the denumerator voltages $V_1'$ and $V_s$ such that the attenuator variable impedance setting differences in db are transferred to the answer dial $D_1$.

In actual apparatus, direct-readings for microphone sensitivities between −55 db and −65 db re 1 volt/$\mu$ bar range have been obtained over frequencies of from about 20 to 8,000 c.p.s. The resulting accuracy was found to be ±0.2 db ±(0.1 db×frequency in kc.) up to 2.5 kc., ±0.7 db above 2.5 kc. to 7 kc., when reference is set to actual barometric pressure.

Though the above illustration has been described in terms of the reciprocity calibration application, moreover, it will be evident that the product of the ratio of successive pairs of measurements or quantities of other types may also be computed in accordance with the invention. Further modifications will also occur to those skilled in the art and all such are considered to fall within the spirit and scope of the invention as defined in the appended claims.

What is claimed is:

1. A method of operating a logarithmically calibrated dial and a variable impedance element having a logarithmic relationship between electrical parameter thereof and position of variation thereof, that comprises, adjusting the position of the dial to correspond to a predetermined constant, making a plurality of electrical measurements, varying the position of the variable impedance element independently of the dial in accordance with a first such measurement, further varying the position of the variable impedance element in accordance with a second measurement while synchronously correspondingly moving the dial, thereby to indicate upon the dial the ratio of the first and second measurements multiplied by the said constant, and successively additionally varying the position of the variable impedance element in accordance with third and fourth of the said measurements, respectively independently of and while synchronously correspondingly moving the dial, in order to indicate upon the dial the product of the ratios of the first and second and third and fourth measurements multiplied by the said constant.

2. A method of operating a logarithmically calibrated dial and a variable impedance element having a logarithmic relationship between electrical parameter thereof and position of variation thereof, that comprises, making a plurality of electrical measurements, varying the position of the variable impedance element independently of the dial in accordance with a first such measurement, further varying the position of the variable impedance element in accordance with a second measurement while synchronously correspondingly moving the dial, thereby to indicate upon the dial the ratio of the first and second measurements, and successively additionally varying the position of the variable impedance element in accordance with third and fourth of the said measurements, respectively independently of and while synchronously correspondingly moving the dial, in order to indicate upon the dial the product of the ratios of the first and second and third and fourth measurements.

3. A method of operating a logarithmically calibrated dial and a variable impedance element having a logarithmic relationship between electrical parameter thereof and position of variation thereof, that comprises, adjusting the position of the dial to correspond to a predetermined constant, making a plurality of electrical measurements, varying the position of the variable impedance element independently of the dial in accordance with a first such measurement, and further varying the position of the variable impedance element in accordance with a second measurement while synchronously correspondingly moving the dial, thereby to indicate upon the dial the ratio of the first and second measurements multiplied by the said constant.

4. A method of operating a logarithmically calibrated dial and a variable impedance element having a logarithmic relationship between electrical parameter thereof and position of variation thereof, that comprises, making a plurality of electrical measurements, varying the position of the variable impedance element independently of the dial in accordance with a first such measurement, and further varying the position of the variable impedance element in accordance with a second measurement while synchronously correspondingly moving the dial, thereby to indicate upon the dial the ratio of the first and second measurements.

5. In the absolute calibration of a first microphone in a cavity system including a second microphone and an auxiliary transducer, a method of operating a logarithmically calibrated dial and a variable impedance element having a logarithmic relationship between electrical parameter thereof and position of variation thereof, that comprises, adjusting the position of the dial to correspond to a predetermined constant, driving the auxiliary transducer to generate first and second electrical measurements representative of the voltages thereupon resulting in the first and second microphones, respectively, driving the second microphone to generate third and fourth electrical measurements representative of the voltage thereupon resulting in the first microphone and a sample voltage from the driving of the second microphone, respectively, varying the position of the variable impedance element independently of the dial in accordance with the first such measurement, further varying the position of the variable impedance element in accordance with a second measurement while synchronously correspondingly moving the dial, thereby to indicate upon the dial the ratio of the first and second measurements multiplied by the said constant, and successively additionally varying the position of the variable impedance element in accordance with the third and fourth of the said measurements, respectively independently of and while synchronously correspondingly moving the dial, in order to indicate upon the dial the product of the ratios of the first and second and third and fourth measurements multiplied by the said constant.

6. In the absolute calibration of a first microphone in a cavity system including a second microphone and an auxiliary transducer, a method of operating a logarithmically calibrated dial and a variable impedance element having a logarithmic relationship between electrical parameter thereof and position of variation thereof, that comprises, driving the auxiliary transducer to generate first and second electrical measurements representative of the voltages thereupon resulting in the first and second microphones, respectively, driving the second microphone to generate third and fourth electrical measurements representative of the voltage thereupon resulting in the first microphone and a sample voltage from the driving of the second microphone, respectively, making a plurality of electrical measurements, varying the position of the variable impedance element independently of the dial in accordance with a first such measurement, further varying the position of the variable impedance element in accordance with a second measurement while synchronously correspondingly moving the dial, thereby to indicate upon the dial the ratio of the first and second measurements, and successively additionally varying the position of the variable impedance element in accordance with third and fourth of the said measurements, respectively independently of and while synchronously correspondingly moving the dial, in order to indicate upon the dial the product of the ratios of the first and second and third and fourth measurements.

7. In the absolute calibration of a first microphone in a cavity system including a second microphone and an auxiliary transducer, a method of operating a logarithmically calibrated dial and a variable impedance element having a logarithmic relationship between electrical parameter thereof and position of variation thereof, that comprises, adjusting the position of the dial to correspond to a predetermined constant, driving the auxiliary transducer to generate first and second electrical measurements representative of the voltages thereupon resulting in the first and second microphones, respectively, varying the position of the variable impedance element independently of the dial in accordance with the first such measurement, and further varying the position of the variable impedance element in accordance with the second measurement while synchronously correspondingly moving the dial, thereby to indicate upon the dial the ratio of the first and second measurements multiplied by the said constant.

8. In the absolute calibration of a first microphone in a cavity system including a second microphone and an auxiliary transducer, a method of operating a logarithmically calibrated dial and a variable impedance element having a logarithmic relationship between electrical parameter thereof and position of variation thereof, that comprises, driving the auxiliary transducer to generate first and second electrical measurements representative of the voltages thereupon resulting in the first and second microphones, respectively, varying the position of the variable impedance element independently of the dial in accordance with the first such measurement, and further varying the position of the variable impedance element in accordance with the second measurement while synchronously correspondingly moving the dial, thereby to indicate upon the dial the ratio of the first and second measurements.

9. In the absolute calibration of a first microphone in a cavity system including a second microphone, a method of operating a logarithmically calibrated dial and a variable impedance element having a logarithmic relationship between electrical parameter thereof and position of variation thereof, that comprises, adjusting the position of the dial to correspond to a predetermined constant, driving the second microphone to generate first and second electrical measurements representative of the voltage thereupon resulting in the first microphone and a sample voltage from the driving of the second microphone, respectively, varying the position of the variable impedance element first in accordance with the first measurement and independently of the dial, and then in accordance with the second measurement while synchronously correspondingly moving the dial, in order to indicate upon the dial the ratio of the first and second measurements multiplied by the said constant.

10. In the absolute calibration of a first microphone in a cavity system including a second microphone, a method of operating a logarithmically calibrated dial and a variable impedance element having a logarithmic relationship between electrical parameter thereof and position of variation thereof, that comprises, driving the second microphone to generate first and second electrical measurements representative of the voltage thereupon resulting in the first microphone and a sample voltage from the driving of the second microphone, respectively, varying the position of the variable impedance element first in accordance with the first measurement and independently of the dial, and then in accordance with the second measurement while synchronously correspondingly moving the dial, in order to indicate upon the dial the ratio of the first and second measurements.

11. A method as claimed in claim 5 and in which the said constant is selected to adjust for barometric pressure and the medium in the cavity.

12. Computation apparatus having, in combination, dial means calibrated in logarithmic units and movable relative to a fixed indicator, variable impedance means provided with a movable control for varying an electrical parameter thereof, the variable impedance means providing a logarithmic variation of such electrical parameter with position of the control, means for enabling engagement and disengagement of the said control and the said dial means, and means for adjusting the successive settings of the said control in accordance with at least a pair of quantities, the enabling means causing only alternate settings to be effected during engagement of the said control and the said dial means, thereby to indicate upon the said dial means at the said indicator the ratio of successive quantities in the case of a single pair of quantities and the product of the ratio of successive pairs of quantities in the case of more than one pair of quantities.

13. Apparatus as claimed in claim 12 and in which means is provided for displacing the dial means a predetermined amount to introduce a constant that multiplies the said ratio and product of ratios.

14. Computation apparatus having, in combination, dial means calibrated in logarithmic units and movable relative to a fixed indicator, variable impedance means provided with a movable control for varying an electrical parameter thereof, the variable impedance means providing a logarithmic variation of such electrical parameter with position of the control, means for enabling engagement and disengagement of the said control and the said dial means, an acoustic cavity containing first and second microphones and an auxiliary transducer, means for driving the auxiliary transducer to subject the first and second microphones to sound pressure that generates respective first and second voltages constituting a first pair of quantities, means for driving the second microphone to generate a third voltage at the first microphone and a fourth sample voltage of the driven second microphone to constitute a second pair of quantities, and means for adjusting the successive settings of the said control in accordance with at least the successive quantities of the first pair of quantities, the enabling means causing only alternate settings to the successive quantities of the pair of quantities to be effected during engagement of the said control and the said dial means, thereby to indicate upon the said dial means at the said indicator the ratio of the first pair of quanities in the case of adjustment by the first pair of quantities only and the product of the respective ratios of the quantities of the first and second pairs of quantities in the case of adjustment to both the first and second pairs of quantities, representing the sensitivity of the first microphone.

15. Apparatus as claimed in claim 14 and in which function multiple-position switching means is provided for enabling in a first set of multiple positions thereof the development of the said first, second, third and fourth voltages, the switching means being coupled to control the control-dial-means engagement and disengagement enabling means, and the variable impedance means being adjustable during a second set of positions of the switching means to enable matching of the said first, second, third and fourth voltages developed in the first set of multiple positions.

16. Apparatus as claimed in claim 15 and in which the said enabling means comprises a cam-controlled brake means controlled by the operation of the switching means.

17. Apparatus as claimed in claim 14 and in which the said control and dial means are rotatable upon coaxially disposed shafts with the enabling means preventing and providing coupling between the shafts.

18. Apparatus as claimed in claim 14 and in which the variable impedance means comprises a logarithmic potentiometer and the dial means calibrations indicate decibels.

19. Apparatus as claimed in claim 14 and in which means is provided for displacing the dial means a predetermined amount to introduce a constant that multiplies the said ratio and product of ratios.

20. Apparatus as claimed in claim 19 and in which the said constant compensates for barometric pressure.

21. Computation apparatus having, in combination, dial means calibrated in logarithmic units and movable relative to a fixed indicator, variable impedance means provided with a movable control for varying an electrical parameter thereof, the variable impedance means providing a logarithmic variation of such electrical parameter with position of the control, means for enabling engagement and disengagement of the said control and the said dial means, and means for adjusting the successive settings of the said control in accordance with at least a pair of quantities representing a numerator quantity and a denominator quantity, the enabling means causing the control setting corresponding to the numerator quantity to hold the said dial means disengaged from the control so as to remain stationary during such setting of the control but to engage the dial means with the said control during the setting thereof to a denominator quantity in order to move the dial means in accordance with such denominator quantity setting of the said control, thereby to indicate upon the said dial means at the said indicator the ratio of successive quantities in the case of a single pair of quantities and the product of the ratio of successive pairs of quantities in the case of more than one pair of quantities.

References Cited

UNITED STATES PATENTS 3,070,310   12/1962   Poupitch _____ 235—194

KATHLEEN H. CLAFFY, *Primary Examiner.*

A. McGILL, *Assistant Examiner.*